United States Patent [19]

Gobled

[11] Patent Number: 5,717,272
[45] Date of Patent: Feb. 10, 1998

[54] BRUSH SUPPORT FOR ROTATING ELECTRIC MACHINE

[75] Inventor: Francis Gobled, Eyzin-Pinet, France

[73] Assignee: Moteurs Leroy-Somer, Angouleme Cedex, France

[21] Appl. No.: 386,864

[22] Filed: Feb. 10, 1995

[30] Foreign Application Priority Data

Feb. 11, 1994 [FR] France ................... 94 01583

[51] Int. Cl.$^6$ ........................... H02K 13/00; H02K 11/00
[52] U.S. Cl. ........................................ 310/239; 310/242
[58] Field of Search ............................ 310/239, 242, 310/245, 71, 42

[56] References Cited

U.S. PATENT DOCUMENTS

| | | | |
|---|---|---|---|
| 1,375,658 | 4/1921 | Gilchrist | 310/237 |
| 3,177,388 | 4/1965 | Cook | 310/247 |
| 3,579,007 | 5/1971 | Walter | 310/242 |
| 4,110,651 | 8/1978 | Fagan | 310/239 |
| 4,381,468 | 4/1983 | Adam et al. | 310/239 |
| 4,698,534 | 10/1987 | Smith et al. | 310/89 |
| 4,855,631 | 8/1989 | Sato et al. | 310/239 |
| 5,043,619 | 8/1991 | Kartman, Jr. | 310/242 |
| 5,245,241 | 9/1993 | Gotoh | 310/242 |
| 5,248,910 | 9/1993 | Yockey et al. | 310/68 R |
| 5,631,513 | 5/1997 | Coles et al. | 310/239 |

FOREIGN PATENT DOCUMENTS

| | | |
|---|---|---|
| 0 043 460 | 1/1982 | European Pat. Off. . |
| 0 261 542 | 3/1988 | European Pat. Off. . |
| 0 291 823 | 11/1988 | European Pat. Off. . |
| 0 351 293 | 1/1990 | European Pat. Off. . |
| 963506 | 7/1950 | France . |
| 3817735 A1 | 12/1988 | Germany . |

Primary Examiner—Steven L. Stephan
Assistant Examiner—Michael J. Wallace, Jr.
Attorney, Agent, or Firm—Young & Thompson

[57] ABSTRACT

The support (6) comprises a moving brush (7) and means (10) for returning the brush so as to keep it in contact with the commutator (4) of the machine. The support (6) comprises clip-in means (13) for fastening the support to the housing (1) of the machine by clipping-in substantially radially to the axis (8) of the housing, and for separating it from this housing by substantially radial unclipping. The support can be easily removed and refitted for replacing the brush or cleaning the commutator.

10 Claims, 2 Drawing Sheets

BRUSH SUPPORT FOR ROTATING ELECTRIC MACHINE

The invention relates to a brush support for a rotating electric machine.

In a rotating electric machine such as a DC motor, the brushes wear rapidly in contact with the commutator. It is therefore necessary to replace the brushes periodically.

What is more, the material thus worn away is deposited in the form of dust especially on the bars of the commutator, which impairs the quality of the contact between the brush and the bars. The material also spreads out throughout the commutator chamber. It is therefore necessary to clean the commutator and commutator chamber regularly.

Some brush supports are composed of a tube fixed radially into the wall of the housing. The brush is on the axis of the tube and is kept in contact with the commutator by a return spring. It is easy to remove the brush. However, the opening made toward the commutative chamber has a surface area equal to the cross sectional area of the brush, which makes it very narrow. Access to the chamber is therefore impossible. What is more, part of the tube extends beyond the surface of the housing so that it can be easily grasped for unscrewing it. As a result, there is a bulk outside the housing which can be regrettable under some conditions.

Other brush supports comprise a disk fixed axially inside the housing. This disk carries the brushes arranged radially and their means of return. The main drawback of this device is that it is necessary to open the housing in order to gain access to the brushes, which constitutes a relatively painstaking operation.

The object of the invention is to alleviate these drawbacks by proposing a brush support which allows both easy and immediate access to the brushes as well as wide access to the commutator chamber and to the commutator in order to allow rapid maintenance of the machine, and to do so without substantially increasing the external overall size of the machine.

This is why the invention is aimed at a brush support for a rotating electric machine, this support comprising a moving brush and means for returning the brush so as to keep it in contact with the commutator of the machine.

According to the invention, the brush support is one which comprises clip-in means for fastening the support to the housing of the machine by clipping-in substantially radially to the axis of the housing, and for separating it from this housing by substantially radial unclipping.

Clip-in means are understood to be means by virtue of which the support is introduced into the housing and becomes fastened as soon as it reaches its intended location. These means allow unclipping in the sense that the support is no longer fastened as soon as it is taken out of its position on the housing.

As the support is not fastened to the housing by screwing but by clipping-in, the hole on the housing which takes the support can be given a large surface area in order to offer wide access to the commutator and to the commutator chamber. Indeed, the clip-in means interact with the edges of the opening or parts of the housing close to it, it being possible for these edges to be far apart.

Clipping-in allows the support to be fastened instantaneously onto the housing and also allows it to be taken off this housing very rapidly, for example for changing the brush.

As the support can be of a large size by comparison with the supports of the state of the art, it is not necessary to design it to extend substantially beyond the surface of the housing. Its large dimensions make it possible for it to be grasped in the hand without difficulty even if it extends beyond the surface of the housing by only two or three millimeters for example.

According to an advantageous version of the invention, the clip-in means comprise a tab having one end which can move in a direction substantially orthogonal to the direction of mobility of the brush.

This tab which bears on the housing may, for example, interact with a part of the body of the support which is opposite the tab and bears on the housing in the opposite direction.

This version ensures that it is particularly easy to fit the brush support on the housing and to remove it whilst providing clip-in means of small size and simple construction.

According to an advantageous version of the invention, in which that region of the housing located in the vicinity of the commutator has a substantially cylindrical shape, that portion of the support which is situated opposite the brush has the overall shape of a sector of a cylinder, so that the brush points substantially in a direction radial to the axis of the cylinder, the cylinder having its axis on the brush side.

This form gives the brush support a very small external size, while matching the external contours of the housing. The absence of a prominent part of the support outside the housing limits the risk of the support being pulled off accidentally.

According to an advantageous version of the invention, the support comprises a pole for electrical connection of the brush, such as a wire or a terminal, which extends from the outer face of the cylinder sector.

According to a preferred version of the invention, the support comprises a metal sheet connected to the brush and at least partially bare relative to the body of the support.

This sheet offers a substantial surface area for the connection of the brush and especially allows the methods by which the brush is connected (screwing, welding, connection inside or outside of the housing, etc.) to be varied using the same support. The same standard support model can therefore be utilised in varied applications, which reduces the cost thereof.

The present invention also envisages a rotating electric machine which includes at least one brush support according to the invention.

The present invention furthermore envisages a rotating electric machine comprising a housing which has recesses for fastening brush supports.

According to the invention, this machine is one wherein the housing comprises, in the vicinity of each recess, clip-in means for fastening the support to the housing by clipping-in radially to the axis of the housing, and for separating it from this housing by radial unclipping.

In fact, the means by which the support is clipped in to the housing may be provided in the region of the housing which is intended to receive the supports rather than on the supports themselves.

According to an advantageous version of the invention, each recess has a hollowed-out surface area which is at least substantially three times greater than the axial cross sectional area of the brush.

Indeed, the provision of clip-in means allows the support and the recess to be given substantial dimensions which allow easy access to the commutator and to the commutator chamber. Of course, this dimension criterion merely constitutes an advantageous minimum, and these elements can very advantageously be given even larger dimensions.

The invention also aims at a method for manufacturing a brush support according to the invention.

According to the invention, the method is one which comprises the successive steps consisting in:

cutting a sheet of metal; and overmolding the body of the support around this sheet by injection molding in order to embed it partially within the body.

Other features and advantages of the invention will further emerge from the description which will follow of a preferred embodiment of the various aspects of the invention. In the appended drawings, given by way of nonlimiting example:

The brush support according to the invention is intended for rotating electrical machines.

In the embodiment which will be described, the machine is a four-pole DC motor.

Figure 1:
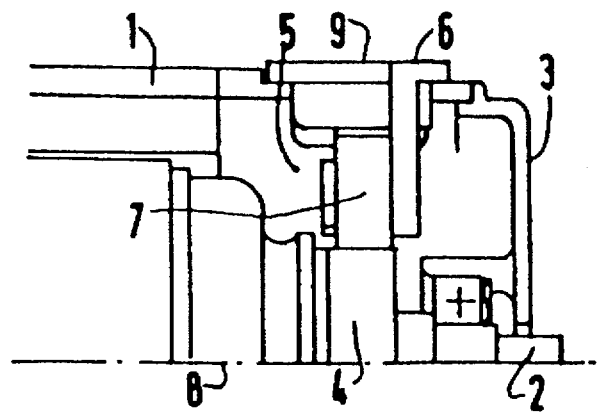
FIG. 1 is a partial view in section of a DC motor comprising a brush support according to one embodiment of the invention.

In FIG. 1, this motor comprises a housing 1 which protects the other parts of the motor from outside. The shaft 2 of axis 8 passes through one end 3 of the housing. The commutator 4 and the commutator chamber 5 are located in the vicinity of the end 3.

The motor comprises four brushes and four brush supports, symmetrically distributed about the axis 8 of the motor.

With reference to FIGS. 1 to 3b, each brush support 6 comprises a brush 7 in the overall shape of a right-angled parallelepiped. The brush 7 of a known type is located in an orientation radial to the axis 8 of the motor with one, 11 of its ends in contact with the commutator 4. The rubbing of this end 11 on the cylindrical commutator 4 has produced the slightly curved shape of this end.

Figure 7:
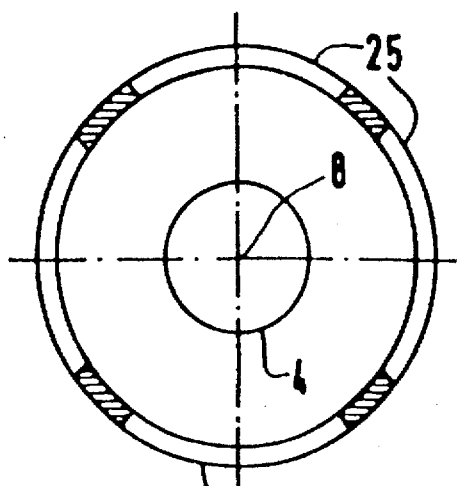
FIG. 7 is a view in axial section of the housing intended to take the brush supports.

As can be seen in the section in FIG. 7 in particular, the region of the housing 1 located in the vicinity of the commutator 4 has a substantially cylindrical shape.

The portion 9 of the support 6 situated opposite the brush 7 and visible on the outside of the housing 1 has the overall shape of a sector of a quarter of a cylinder so that the brush 7 is oriented substantially in a direction radial to the axis of the cylinder. The cylinder has its axis on the brush 7 side, this axis being coincident with the axis 8 of the motor when the support 6 is installed on the housing 1.

The brush 7 can move radially inside the support 6 in a tubular duct 12 of rectangular cross section which matches the contours of the brush 7. The support 6 comprises means for returning the brush 7 in order to keep it in contact with the commutator 4. These means comprise a return spring 10 visible in FIGS. 3a and 3b. This coil spring 10 is located with its axis 21 parallel to the axis 8 of the motor. One of the ends of the spring is fastened to the body of the support, while the other end bears on the opposite end of the brush 7 from the commutator 4.

The support 6 comprises clip-in means for fastening the support to the housing 1 of the motor by clipping-in substantially radially to the axis 8 of the housing 1, and for separating it from this housing by substantially radial unclipping.

Figure 2A:
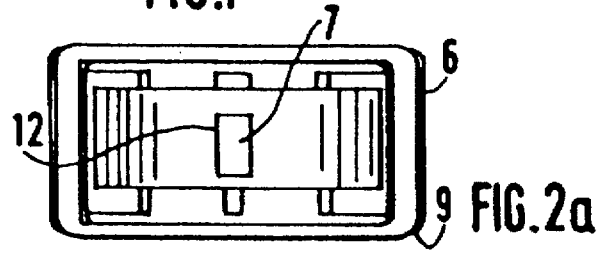
FIGS. 2a, 2b and 2c are views respectively from below, in elevation and from the left in axial section of the body of the brush support of FIG. 1.
Figure 2B:
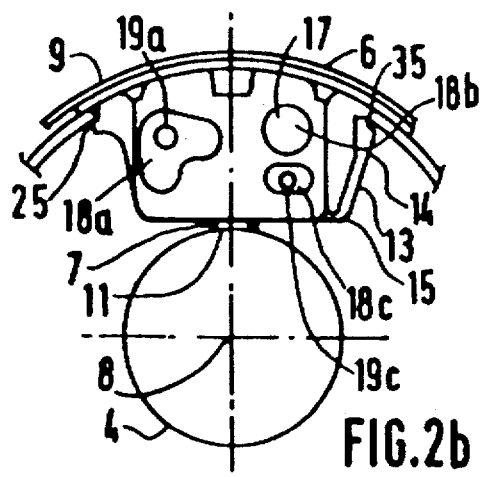

In the present example, the clip-in means comprise a tab 13 having one end 14 which can move in a direction substantially orthogonal to the direction of mobility of the brush. In FIG. 2b, as the brush can move up and down, the end 14 can move from left to right. The end 14 has a shoulder 35 pointing toward the outside of the support.

The tab 13 is rigidly fastened by a second end 15 to the body of the support 6 and is made in an elastic material, for example in a suitable plastic as will be seen later.

The support 6 furthermore comprises means for electrical connection of the brush 7.

Figure 3A:
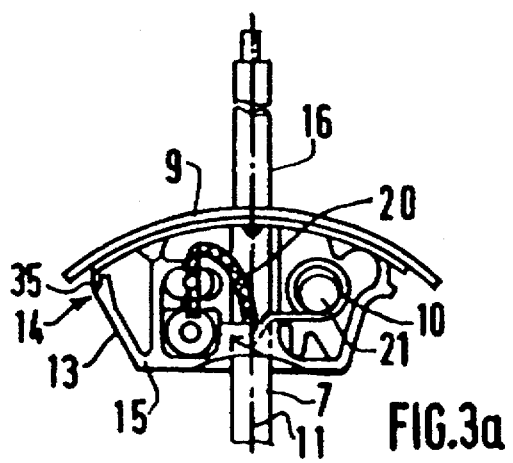
FIGS. 3a and 3b are views from behind and from the right in axial section of the brush support of FIG. 1.
Figure 3B:
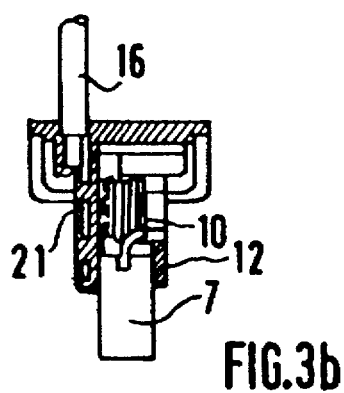

With reference to FIGS. 3a and 3b, the connection means comprise a connection pole, such as a wire 16 which extends from the outer face of the portion 9 in the shape of a sector of a cylinder.

The connection means also comprise a metal sheet 17, for example made of brass, connected to the brush 7 and joined to the wire 16. The sheet 17 has a rectangular overall shape and extends in a plane substantially parallel to the direction of mobility of the brush. In the present example, this plane is orthogonal to the axis 8 and is the plane of FIGS. 2b and 3a.

Figure 2C:
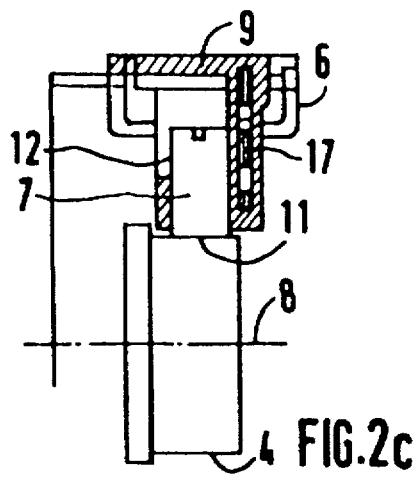

The sheet 17 is at least partially bare relative to the body of the support as FIGS. 2b and 2c show, these figures representing the support 6 with just the body and the sheet 17. In FIG. 2b, the bare parts 18a, 18b and 18c of the sheet 17 can be made out. The sheet 17 is partially embedded within the mass of the body of the support.

The bare parts 18a and 18c of the sheet 17 each have a respective hole 19a and 19c. The hole 19a is designed to allow the fastening of a screw or the like. In order to do this, the region of the body of the support which is situated behind this hole in FIG. 2b is tapped.

The brush 7 is joined to the sheet 17 by means of a copper braid 20, the flexibility of which does not impair the mobility of the brush.

The whole of the support 6, except for the brush 7, the return means 10 and the connection means, is made in a suitable plastic. This plastic must withstand temperature variations ranging from −20° C. to 200° C. without flowing and while expanding very little. It must also exhibit the resilience necessary for the elasticity of the tab 13.

In order to fulfill these criteria, the body of the support may advantageously be made in polyamide 46 30% filled with glass fiber, marketed particularly by the DSM group under the trade name Stanyl TW 200 F6.

In order to take the supports 6, the housing 1 of the motor has recesses 25 for fastening the supports, as seen in FIGS. 2b and 7. These recesses have been produced by taking out of the cylinder constituting the wall of the housing 1 four respective portions of cylinder sector.

Each recess 25 represents a hollowed-out surface area which is smaller than the surface area of the portion 9 of the support 6 in the shape of a sector of a cylinder, but at least substantially three times larger than the axial cross sectional area of the brush 7. In the present embodiment, the cross section of each recess 25 is distinctly greater because it is bigger than the cross sectional area of the brush 7 by a factor of 10.

Thus, in the present mode, the sum of the measurement of the surface areas hollowed out from the housing, corresponding to the recesses 25 visible in section in FIG. 7, is at least substantially greater than or equal to half the sum of the measurement of the non hollowed-out surface areas located between two successive recesses 25 (which are cross-hatched in this same figure).

These dimensional ratios bear witness to the fact that when the four supports 6 are taken out of the housing, the four recesses 25 give very wide access to the commutator 4.

The brush support 6 according to the invention is manufactured in the following way:

the sheet 17 is cut and, if need be, the wire 16 is soldered to it in this same step;

the assembly is put in place in a suitable overmolding tool;

the body of the support made of a plastic substance is overmolded around the sheet 17 by injection molding using a conventional injection-molding technique so as partially to embed the sheet 17 in the body;

the brush 7 is fitted into the duct 12 of the support 6;

the copper braid 20 is soldered to the sheet 17 and to the brush 7; and the spring 10 is installed in the support.

The support 6 according to the invention is used as follows.

Figure 5A:
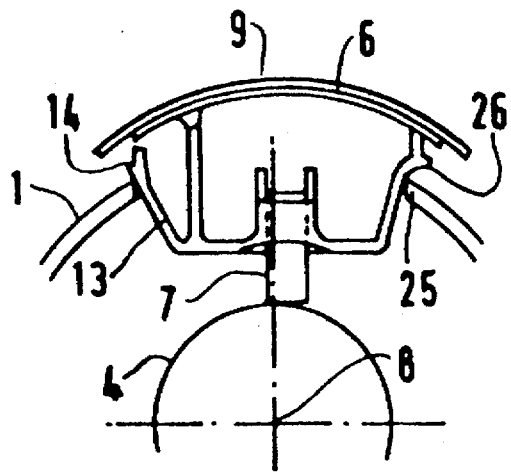
FIGS. 5a, 5b and 6a, 6b are views similar to FIG. 3a showing two steps respectively in the fitting of the brush support to the housing and in its removal therefrom.
Figure 5B:
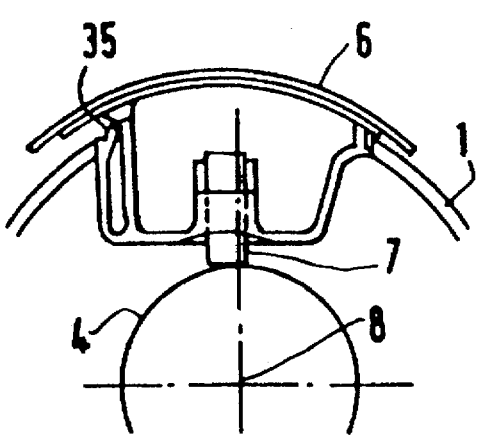

With reference to FIGS. 5a and 5b, in order to fasten the support 6 to the housing 1, the support 6 is offered up, partially inserting it into the housing 1. When the support 6 is in contact with the edges of the recess 25 via the tab 13 and the face 26 of the support opposite the tab 13 as in FIG. 5a, the portion 9 in the shape of a sector of a cylinder is pressed radially. The tab 13 bends partially toward the body of the support so that the support penetrates further into the recess 25 as in FIG. 5b. When the support has reached its position in the housing, clipping-in takes place through the sudden deployment of the tab 13, the end 14 of which becomes pressed against the wall of the housing, the shoulder 35 preventing the support from coming out, as in FIG. 2b.

Figure 6A:
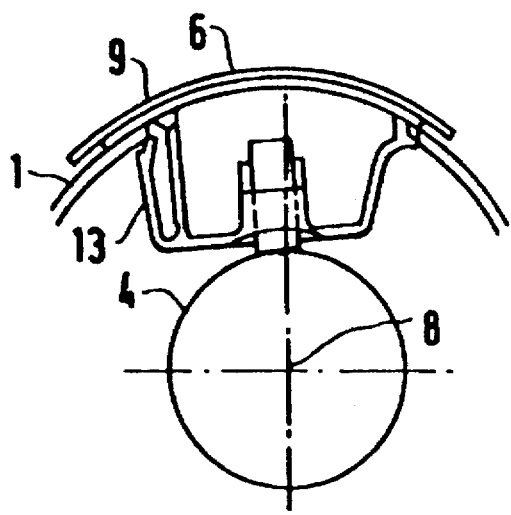
Figure 6B:
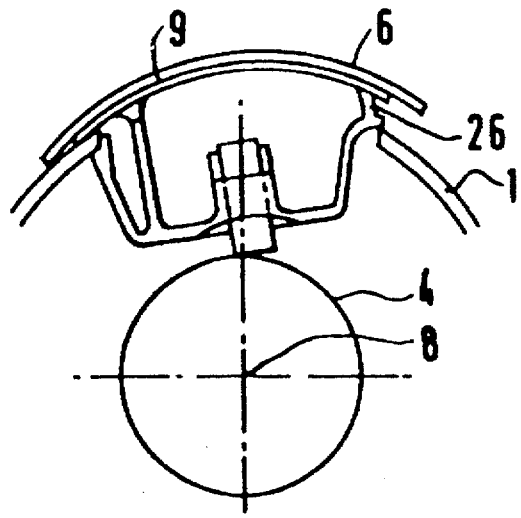

In order to take the support 6 off the housing 1, with reference to FIGS. 6a and 6b, the support 6 is pressed tangantially to the wall of the housing (in the direction of mobility of the tab 13, toward the left in FIG. 6a) in order to press the tab 13 against the edge of the recess 25. Under the pressure, the tab 13 moves toward the body of the support while the end 26 moves away from the other edge of the recess 25 as in FIG. 6a. When the end 26 has moved away sufficiently into the unclipping position, slight tilting about the edge of the recess in contact with the tab 13 allows the support to be disengaged from the recess 25 via the end 26, as in FIG. 6b.

The installation and removal of the support according to the invention are therefore very rapid and can be achieved for each maintenance operation in order to give access to the commutator 4, to the commutator chamber 5 and to the brush 7.

The bare parts of the sheet 17 allow various types of connection to be achieved inside the motor on one side of the support 6 or on the other, the support not having the wire 16. Alternatively, the external connection of the brush by means of the wire 16 leaves the inside of the housing on either side of the support 6 free, which makes it possible to locate other members such as a brake disk, for example, therein.

Figure 4:
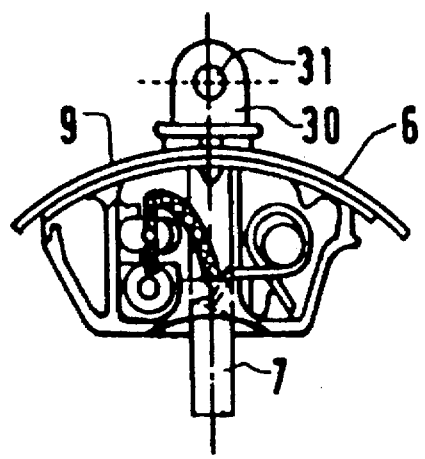
FIG. 4 is a view from behind of an alternative embodiment of the brush support.

FIG. 4 shows an alternative to this embodiment. In this alternative, the wire 16 is replaced by a rigid terminal 30 provided with a hole 31. Like the wire, the terminal 30 is joined to the sheet 17 so as to be connected to the brush.

The brush support according to the invention guides the brush, it keeps the brush pressed against the commutator and allows for the electrical connection of the brush, independently of the casing of the machine. It externally closes off access to the brush and to the commutator chamber and fastens autonomously on to the machine without a tool.

The brush support is securely fastened to the housing but can be taken off as easily as it can be installed. Once taken off, it offers wide access to the commutator chamber and to the brush.

The brush support is completely independent of the bearings of the machine. It allows the brush or support to be replaced without dismantling the machine.

Of course numerous modifications and improvements could be made to the invention without departing from the scope of the latter.

I claim:

1. In a brush support for a rotating electric machine, said support (6) comprising a moving brush (7), means (10) for returning the brush so as to keep it in contact with a commutator (4) of the machine and means for fastening the support to a housing (1) of the machine by clipping-in substantially radially to a longitudinal axis (8) of the rotating machine; the improvement wherein the means for fastening comprises two clipping/unclipping means (13, 26) on opposing sides of the support in positions to hold the support in the housing when the support is positioned therein one of said clipping/unclipping means being elastic and permitting the substantially tangential movement of the support relative to the housing (1) for a distance sufficient to unclip the other said clipping/unclipping means, so as to unclip the support from the housing.

2. The support as claimed in claim 1, wherein the elastic one of said clipping/unclipping means comprises one end (14) which can move in a direction substantially orthogonal to the direction of mobility of the brush (7) relative to the support.

3. The support as claimed in claim 2, wherein said one end (14) is rigidly fastened via a second end (15) to a body of the support and is made of an elastic material.

4. The support as claimed in claim 1, wherein a region of the housing (1) located in the vicinity of the commutator (4) has a substantially cylindrical shape, wherein a portion (9) of the support which is situated opposite the brush (7) has a shape of a sector of a cylinder so that the brush points substantially in a direction radial to the axis of the cylinder, the cylinder having its axis on the brush (7) side of said portion (9).

5. The support as claimed in claim 4, further comprising a pole for electrical connection of the brush, said pole extending from an outer face of the portion (9).

6. The support as claimed in claim 1, which further comprises a metal sheet (17) connected to the brush (7) and at least partially bare relative to the body of the support, the body of the support being overmolded around the sheet (17) by injection.

7. A rotating electrical machine which includes a commutator in a housing and at least one brush support, said support comprising a moving brush, means for moving the brush so as to keep it in contact with the commutator, and two clipping/unclipping means on opposing sides of said support in positions to hold said support in the housing by clipping-in substantially radially to a longitudinal axis of the rotating machine, one of said clipping/unclipping means being elastic and permitting the substantially tangential movement of said support relative to the housing for a distance sufficient to unclip the other said clipping/unclipping means, so as to unclip said support from the housing.

8. The rotating electrical machine of claim 7, wherein the housing for the machine comprises a recess (25) for said receiving said support.

9. The machine as claimed in claim 8, wherein the elastic one of said clipping/unclipping means comprises a tab which can move in a direction which is substantially orthogonal to the direction of mobility of the brush relative to the support.

10. The machine as claimed in claim 8, wherein said recess (25) is a hollowed-out surface area which is at least substantially three times greater than the axial cross sectional area of the brush.

* * * * *